United States Patent [19]

Takakura et al.

[11] Patent Number: 5,791,776
[45] Date of Patent: Aug. 11, 1998

[54] HERMETICALLY CLOSED KNEADING APPARATUS

[75] Inventors: Ko Takakura; Kashiro Ureshino; Norifumi Yamada; Yoshinori Kurokawa, all of Takasago, Japan

[73] Assignee: Kabushiki Kaisha Kobe Seiko Sho, Kobe, Japan

[21] Appl. No.: 750,783

[22] PCT Filed: Apr. 24, 1996

[86] PCT No.: PCT/JP96/01101

§ 371 Date: Dec. 20, 1996

§ 102(e) Date: Dec. 20, 1996

[87] PCT Pub. No.: WO96/33851

PCT Pub. Date: Oct. 31, 1996

[30] Foreign Application Priority Data

Apr. 24, 1995 [JP] Japan .................................... 7-124265

[51] Int. Cl.$^6$ ...................................................... B01F 7/08
[52] U.S. Cl. ................................................. 366/84; 366/300
[58] Field of Search ................................. 366/84, 318, 300, 366/83, 79, 292, 297; 425/204

[56] References Cited

U.S. PATENT DOCUMENTS

| | | |
|---|---|---|
| 3,416,774 | 12/1968 | Fritsch . |
| 3,729,178 | 4/1973 | Stade .......................................... 366/84 |
| 4,053,144 | 10/1977 | Ellwood . |
| 4,058,297 | 11/1977 | Scufert ........................................ 366/83 |
| 4,176,968 | 12/1979 | Kromer et al. . |
| 4,184,773 | 1/1980 | Ellwood ...................................... 366/300 |
| 4,744,668 | 5/1988 | Nortey . |
| 4,871,259 | 10/1989 | Harada et al. ............................. 366/300 |
| 4,914,635 | 4/1990 | Nishigai et al. . |
| 4,935,164 | 6/1990 | Wessling et al. . |

*Primary Examiner*—Tony G. Soohoo
*Attorney, Agent, or Firm*—Oblon, Spivak, McClelland, Maier & Neustadt, P.C.

[57] ABSTRACT

A hermetically closed kneading apparatus includes a casing member (1) having a chamber (2) and one pair of counter rotating, parallel rotors (3) (4). Each of rotor has three long blades (18) (19) (20) and of which the central axes (17a) (17b) of the rotors are set apart from each other so that the long blades may not mesh with each other. Each of the long blades extends spirally around the central axis (17a) (17b) of the rotors and are set apart from each other by an equivalent angle in a circumferential direction of the rotor. Each rotor has a profile corresponding to any one of the following features: (a) the profile is almost triangular, (b) the profile includes a straight line in each non-action (22) surface of the rear surface (26) of each blade with respect to a rotation direction, the straight line starts from edge (18a) of a tip (21) of each blade (18). (c) the profile includes any one of an approximately gentle concave line, an approximately gentle convex line and an approximate straight line in each rear surface (26) of each blade with respect to a rotation direction, and the rotors have a maximum diameter Dr and a minimum diameter Dd of which the ratio falls in a range of 0.5<Dd/Dr<0.75. (d) preferably the ratio falls in a range 0.6<Dd/Dr<0.7. In other words, a sectional shape of the non-action surface in the rear surface of the rotor with respect to a rotation direction is comparatively flat.

19 Claims, 14 Drawing Sheets

HERMETICALLY CLOSED KNEADING APPARATUS

TECHNICAL FIELD

This invention is one of kneading apparatuses which is hermetically closed and kneads a batch of material in it. In addition, this invention makes productivity improve.

BACKGROUND ART

Rubber used in tire and so on is uniform mixture of a crude rubber and additives such as sulphur, carbon and filler etc. A hermetically closed kneading apparatus is used for kneading the crude rubber and the additives. By using such the hermetically closed kneading apparatus, a plastic degree of the rubber falls down and a dispersion of additives is carried out. By the way, a rubber used for a radial tire of automobile is rigid, therefore, it is difficult to make the dispersion of additives uniform in comparison with any other rubber.

In view of this problem, some prior hermetically closed kneading apparatuses are shown in Patent publications of No.58-4567 and 58-5094, which can carry out the uniform dispersion of additives in comparison with any other prior apparatuses.

One of the prior hermetically closed kneading apparatuses shown in the above Patent publications possesses one pair of rotors in a chamber of which sectional view looks like a shell of a cocoon. The each rotor is arranged in parallel with each other without meshing with each other and rotates in a contrary direction to each other.

The each rotor has 4 total number of blades to include 2 number of long blades and 2 number of short blades. The each long blade is apart from each other by an equivalent angle in a circumferential direction of the rotor. The each short wing is also apart from each other by an equivalent angle in the circumferential direction of the rotor. Moreover, a thrust ratio, a blade length ratio and so on of the long blade to the short blade are established adequately as for each rotor. In other words, a kneading operation of the prior hermetically closed kneading apparatus is made to improve by means of increasing the total number of the blades from 2 to 4 blades.

Nowadays, a hardness of rubbers tends to become higher in order to make a quality of tires improve. Accordingly, a uniformity concerning the dispersion of the additives is strictly required.

Even though the rotor having 4 total number of blades as mentioned above is used, the additives will not be uniformly dispersed for a desired kneading time. Consequently, a kneading time tends to become long. In case the kneading time is long, temperature of a kneaded rubber rises and vulcanization and so on happen, finally, a quality of rubber changes. For this reason, when the temperature of the kneaded rubber rises to a certain degree, the kneaded rubber is taken out from the chamber and cooled. And then the kneading operation is performed again after the cooling. Thus, the kneading step is achieved over a plurality of alternate performances with respect to the kneading and cooling operation. When the kneading step is achieved over plurality of performances like this, a productivity per unit time of kneading apparatus will fall down drastically.

A hermetically closed kneading apparatus of a sealing type is shown in Patent Publication Number Showa 63-47107 (U.S. Pat. No. 4,871,259), which reduces number of performances concerning the kneading operation and improves a kneading efficiency. This hermetically closed kneading apparatus possesses one pair of rotors in a chamber of which sectional view looks like a shell of a cocoon. Each rotor is arranged in parallel with each other without meshing with each other and rotates in a contrary direction to each other.

The each rotor has 3 number of long blades and 3 number of short blades. The each long blade is apart from each other by an equivalent angle in a circumferential direction of the rotor. The each short blade is also apart from each other by an equivalent angle in the circumferential direction of the rotor. The long blades and the short blades are joined respectively. In a view of the rotor profile, a rear surface of each blade with respect to a rotation direction is cut off by a line which intersects a tangent line for the rotation direction with an angle range from 40° to 140° in order to make an accommodating capacity concerning the rubber increase. Further, for the purpose of preventing material such as the rubber from remaining in a space of the chamber corresponding to the cut off portion, the long blades and the short blades are joined respectively and a distance between each central axis of one pair of rotors is made narrow so that each blade may mutually engages.

However, there are some troubles in the above mentioned hermetically closed kneading apparatus. For example, a total capacity with respect to material decreased in comparison with the hermetically closed kneading apparatus having 2 number of long blades since the distance between each central axis of one pair of rotors is made narrow even though the cut off portion is made on the blades in order to make a capacity concerning the material increase. Further, while an area of the cut off portion of the blade is made larger in order to make a capacity concerning the material increase, naturally, some of the material such a rubber remains in the space of the chamber corresponding to the larger cut off portion without undergoing the kneading operation and some of additives such as a carbon remains without mixing with the material such as a rubber.

In view of the foregoing problems with the prior art techniques, the present invention has been made. It is an object of the present invention to provide a hermetically closed kneading apparatus comprising one pair of rotors arranged in parallel without meshing with each other, wherein each rotor has 3 number of long blades apart from each other by an equivalent angle in a circumferential direction of the rotor and which enables to knead material uniformly without reduction of capacity with respect to material such as a rubber.

DISCLOSURE OF THE INVENTION

A hermetically closed kneading apparatus according to the present invention is intended to solve the foregoing problem and comprises a casing member having a hermetical chamber of which sectional view looks like a shell of a cocoon and one pair of rotors which are arranged in the chamber in parallel with each other, which rotate in a contrary direction to each other, each of which has 3 number of long blades and of which central axes are set apart from each other so that the long blades may not mesh with each other, wherein each of the long blades extends spirally around the central axis of the rotor and is set apart from each other by an equivalent angle in a circumferential direction of the rotor and a rotor profile with the long blades corresponds any one of following views (a)–(d) at least.

(a) The rotor profile is almost triangular.

(b) The rotor profile includes a straight line in each non-action surface of rear surfaces of the blades with respect to a rotation direction, the straight line starts from edge of a tip of the blade.

(c) The rotor profile includes any one of an approximately gentle concave line, an approximately gentle convex line and an approximate straight line in each rear portion of the blades with respect to a rotation direction, and the rotor has a maximum diameter Dr and a minimum diameter Dd of which ratio falls in a range 0.5<Dd/Dr<0.75.

(d) The rotor profile includes any one of an approximately gentle concave line, an approximately gentle convex line and an approximate straight line in each rear portion of the blades with respect to a rotation direction, and the rotor has a maximum diameter Dr and a minimum diameter Dd of which ratio falls in a range 0.6<Dd/Dr<0.7.

According to the above present invention, a cooling property against a kneaded material is sufficient in comparison with the prior kneading apparatus having 2 number of long blades since the novel kneading apparatus of the present invention has 3 number of long blades and whole surface area of the rotor increases. Consequently, the novel kneading apparatus enables one continuous time of kneading operation to be long. Further, a capacity concerning the kneaded material of the novel kneading apparatus does not decrease in comparison with the prior kneading apparatus of which the long blades mesh with each other since the central axes of the novel kneading apparatus are set apart from each other so that the long blades may not mesh with each other.

It is necessary for the novel kneading apparatus to take-in the kneaded material on an action surface of a front surface of the blade assuredly because the long blades may not mesh with each other. Here the front surface of the blade is located ahead of a tip of the blade with respect to the rotation direction.

Therefore, a shape of the non-action surface in the rear surface is especially important in order to achieve the assured taking-in. Here the rear surface of the blade is located behind the tip of the blade with respect to the rotation direction.

It is confirmed experimentally that an amount of the kneaded material taken-in on the non-action surface is reduced when the shape of non-action surface, in a view of a rotor profile, conforms a line such as a sharp concave or convex line as shown in prior art.

Concretely, it is necessary that the shape of the non-action surface in the view of the rotor profile conforms to a almost flat surface which satisfies any one of conditions (a)–(d) at least as mentioned above. Here the non-action surface is defined by a surface extending backward with respect to the rotation direction from a rear edge of one tip equipped on one blade by a distance which falls in a range from ½ to 9/10 concerning a distance between rear edges of tips equipped on the blades.

As above mentioned, in the novel kneading apparatus of the present invention, each rotor in a pair has 3 number of long blades which are set apart from each other by the equivalent angle in the circumferential direction of the rotor and each rotor in a pair does not mesh with each other and further the shape of non-action surface of the rear surface of the blade with respect to the rotation direction is made almost flat in the view of the rotor profile. Whereby, the cooling property is increased, the number of times concerning the kneading performances is decreased and an substantial capacity of the chamber is prevented form decreasing. The productivity can be improved efficiently in comparison with one prior kneading apparatus wherein each rotor in a pair does not mesh with each other, each of rotors has 4 number of blades including 2 number of long blades and 2 number of short blades and the each long blade is not joined to the each short blade.

The productivity can be also improved efficiently and further prevent some of additives such as a carbon from remaining without mixing with the material such as a rubber in comparison with another prior kneading apparatus wherein each rotor in a pair meshes with each other, each of rotors has 3 number of long blades with the cut-off portions and 3 number of short blades and the each long blade is joined to the each short blade.

Moreover, in the novel kneading apparatus satisfying any one of conditions (a)–(d) at least, it is preferable that, in the view of the rotor profile, a shape of the action surface is contoured by a convex line and the action surface and the non-action surface is smoothly linked together so that the whole rotor profile may be contoured by a continuously gentle line.

And, in the novel kneading apparatus satisfying any one of conditions (c) or (d), it is preferable that, in the view of the rotor profile, the non-action surface is contoured by a line which is approximately gentle convex line in order to increase an amount of material taken-in on the non-action surface.

Also, in the novel kneading apparatus satisfying any one of conditions (a)–(d) at least, it is preferable that each rotor is further provided with 3 number of short blades which have similar sectional shapes to ones of the long blades and the short blades are not joined to the long blades. When the short blades is not joined to the long blades as above, the kneaded material moves about actively in an axial direction of the chamber. Consequently, an unevenness concerning a dispersion of additives decreases in the chamber and a property of the kneading operation can be improved.

And also, in the novel kneading apparatus which satisfies any one of conditions (a)–(d) at least and of which the short blades are not joined to the long blades, it is preferable that a length ratio of the short blade to the long blade falls in a range from 0.1 to 0.67. When the length ratio of the short blade to the long blade falls in a range from 0.1 to 0.67 as above, the kneaded material moves about assuredly in the axial direction of the chamber. Consequently, an unevenness concerning a dispersion of additives decreases in the axial direction of the chamber and the property of the kneading operation can be improved.

Moreover, in the novel kneading apparatus which satisfies any one of conditions (a)–(d) at least and of which short blades are not joined to the long blades, it is preferable that a portion of the rotor has both long and short blades in the view of the rotor profile. When the portion of the rotor has both long and short blades the view of the rotor profile, opportunities of undergoing the kneading operation on the material, increases in this portion of the rotor.

BEST MODE FOR CARRYING OUT THE INVENTION

Figure 1:
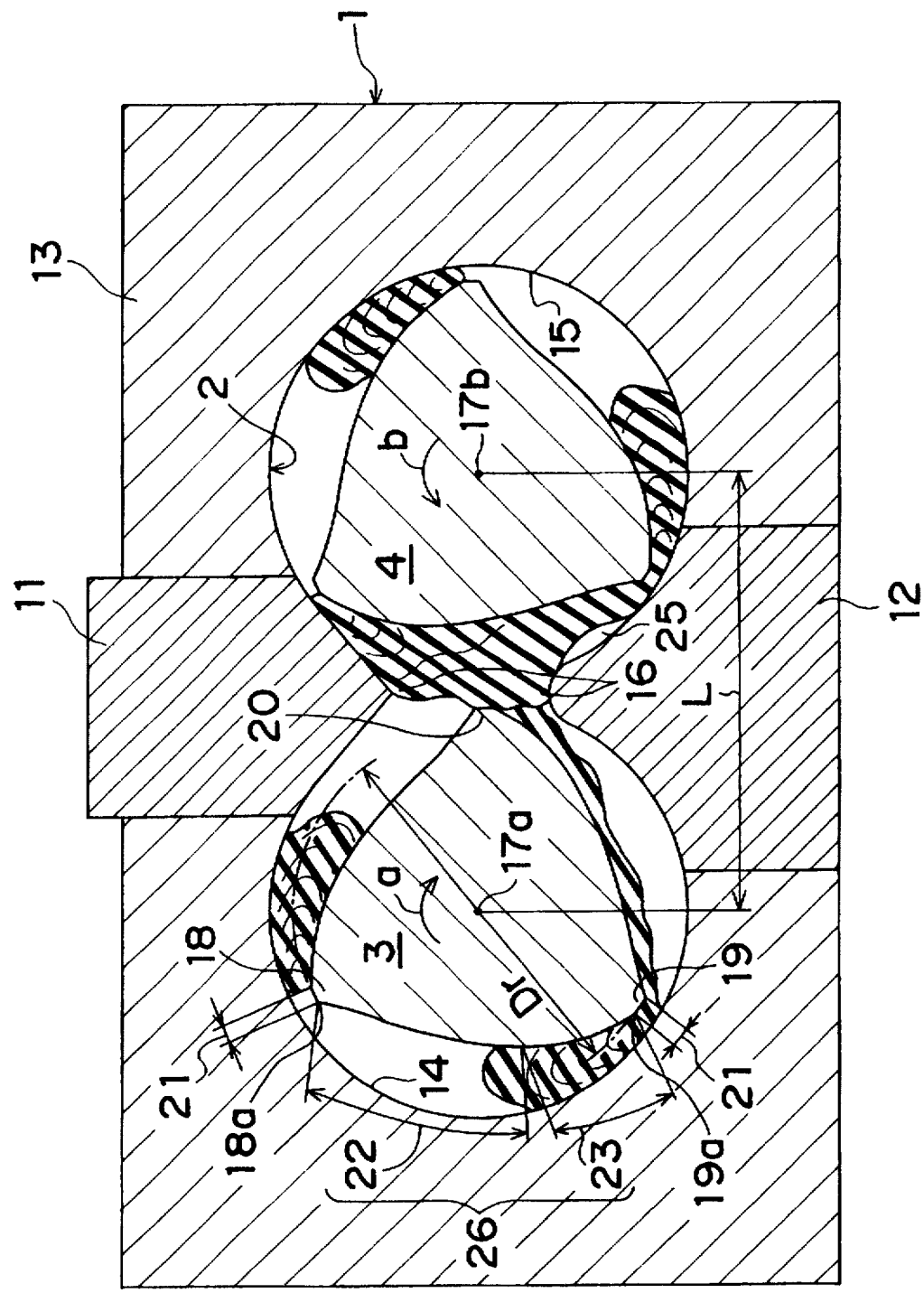
FIG. 1 shows an essentially sectional view of a hermetically closed kneading apparatus according to the present invention.
Figure 2:
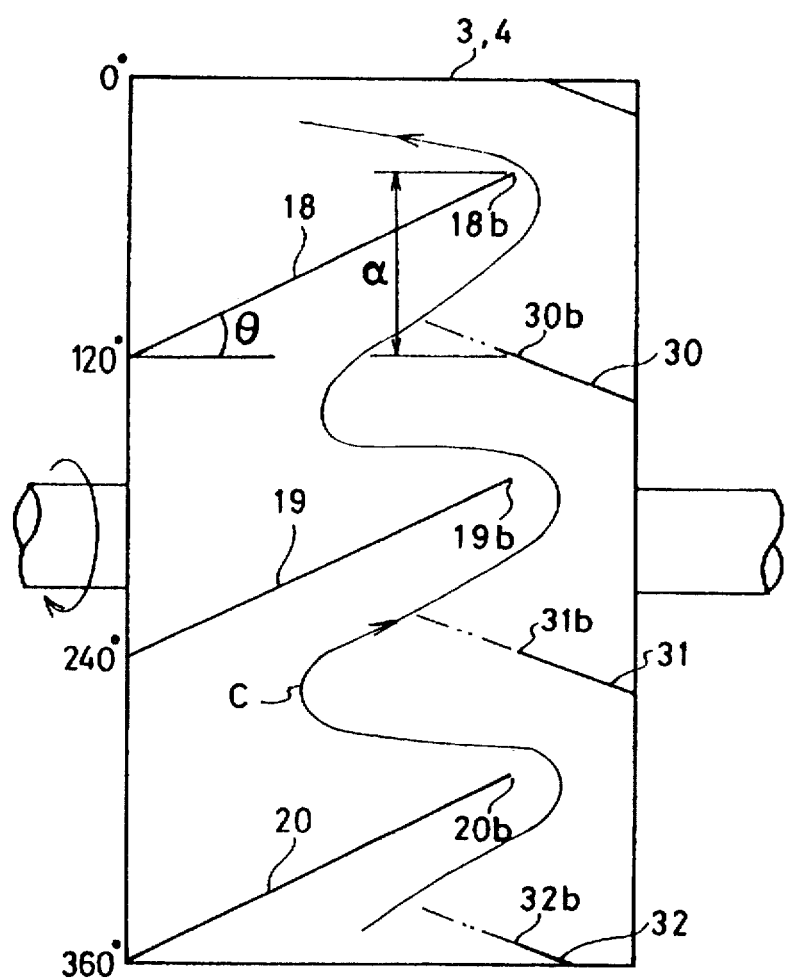
FIG. 2 shows a development of a rotor in the present invention.

Embodiments of the present invention are hereinafter described by reference to the accompanying drawings. FIG. 1 shows an essentially sectional view of a hermetically closed kneading apparatus according to the present invention and FIG. 2 shows a development of a rotor in the kneading apparatus.

A housing 1 in FIG. 1, comprises a casing member 13 and end plates which are not illustrated in FIG. 1. The casing member 13 is provided with a floating weight 11 and a drop door 12. The end plates could be prepared at both ends of the casing member 13 in a piercing direction through the FIG. 1. There is a chamber 2 formed inside of the casing member 13, of which sectional view looks like one of a cocoon shell as illustrated in FIG. 1. The sectional shape of the chamber 2 like a cocoon shell is contoured with a right room 15, a left room 14 and a bridge part 16 which connects spaces between the left room and the right room. one pair of rotors 3, 4 are installed in the right and left rooms respectively so as to rotate around central axes 17a,17b. A distance between the central axes 17a, 17b is larger than a maximum diameter of the rotor so that one pair of rotors 3, 4 can rotate in a contrary direction to each other as illustrated by arrows a, b in FIG. 1 without mashing with each other. A material like a rubber is pushed with the floating weight and thrown into the chamber 2. The material like a rubber undergoes kneading operations with the rotors 3, 4 in the chamber 2. Afterward, the material like a rubber is discharged to open the drop door 12. Each of rotors has 3 number of long blades 18, 19, 20 set apart from each other by an 120° equivalent angle in a circumferential direction of the rotor as illustrated. The apexes of each long blade 18, 19, 20 have tips respectively. There are fixed gaps between an inside wall of the chamber 2 and these tips. A rear surface 26 of the long blade 18 with respect to a rotation direction is defined by a surface extending backward with respect to the rotation direction from a rear edge 18a of the tip 21 equipped on the blade 18 to a front edge 19a of the tip 21 equipped on the blade 19, which is divided into a non-action surface 22 concerning the tip 21 of the blade 18 and an action surface 23 concerning the tip 21 of the blade 19.

The action surface 23 is used for accumulating the kneaded material in order to lead the kneaded material on the tip 21, of which shape is ordinary a convex surface. The non-action surface 22 plays an important role when the kneaded material is caught from the bridge part 16 into the action surface 23, of which sectional shape is a straight line starting from the rear edge 18a of the tip 21 on the long blade 18. Each rotor profile 3, 4 is almost triangular since the non-action surface 22 in the view of the rotor profile is longer than the action surface 23.

Figure 6:
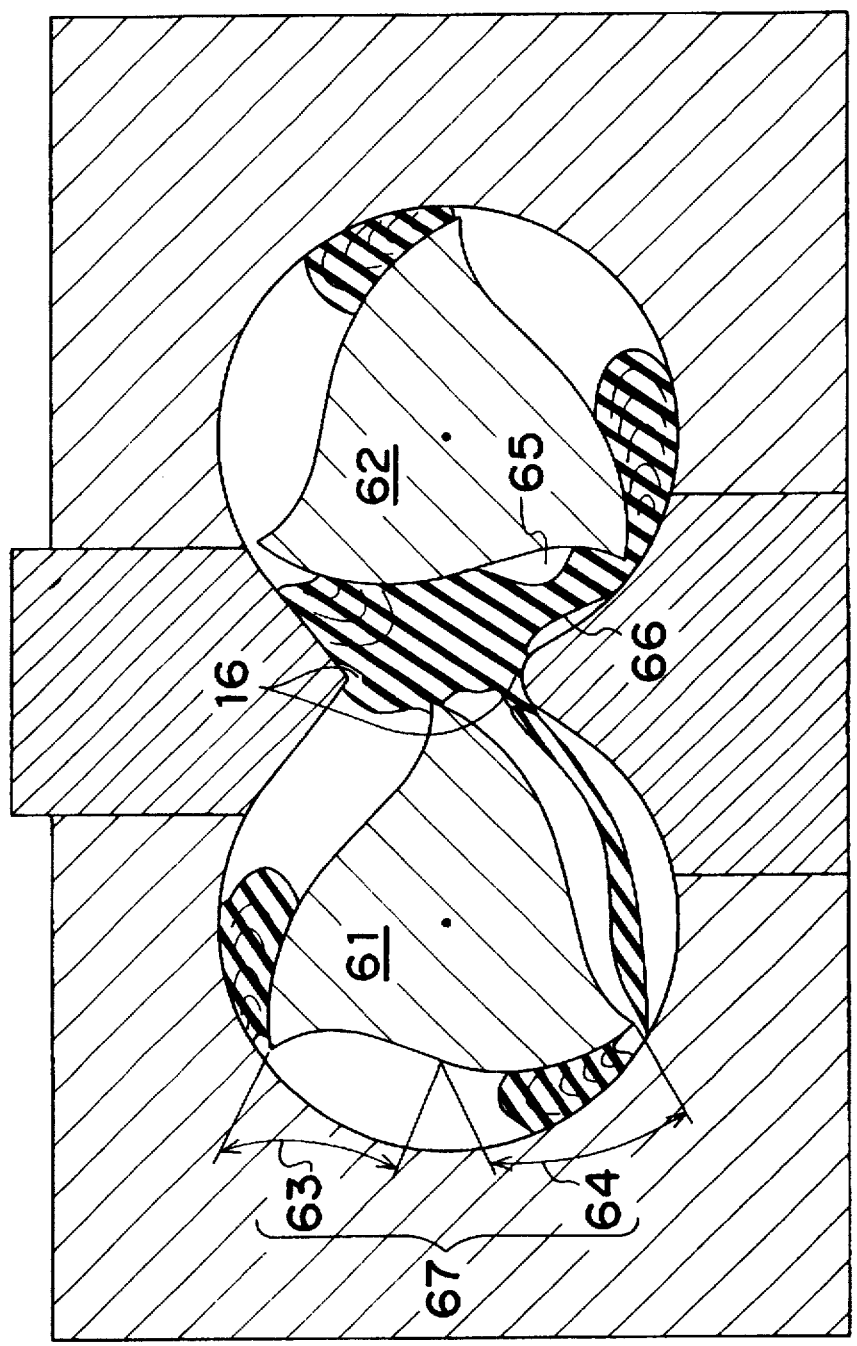
FIG. 6 shows an essentially sectional view of a prior hermetically closed kneading apparatus as a first comparable example with the present invention.
Figure 7:
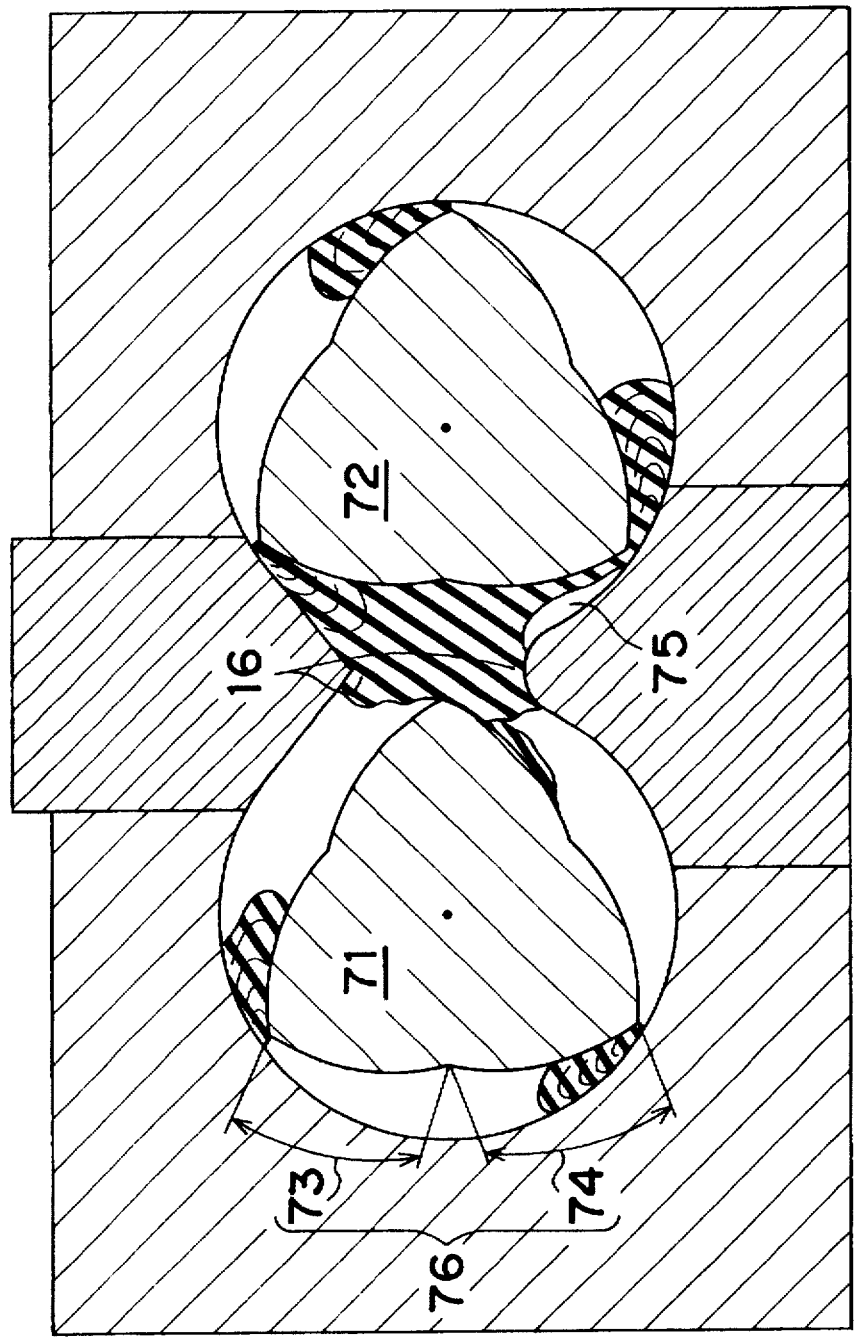
FIG. 7 shows an essentially sectional view of a prior hermetically closed kneading apparatus as a second comparable example with the present invention.

It can be clearly distinguished as described hereinafter from a rotor profile like tooth of a rotary saw as shown in FIG. 6 or a roundish rotor profile as shown in FIG. 7.

FIG. 2 shows a development of each rotor 3,4. Each of long blades 18, 19, 20, which is set apart from each other by an 120° equivalent angle in the circumferential direction of the rotor, extends in an axial direction from one end toward a center of the rotor with a gradient θ from the axial direction so as to spirally around a central axis of the rotor and then stops extending in a part of the way in order to move the kneaded material toward the center of the rotor. Further, each of short blades 30, 31, 32 extends in the axial direction from other end toward the center of the rotor between the long blades 18, 19, 20 and then stops extending in a part of the way. The long and short blades are not joined. Therefore, the kneaded material winds its way through the blades in the axial direction as following a arrow c.

Hereon, the stop points 18b, 19b, 20b, 30b, 31b, 32b of the both long and short blades are aligned in the circumferential direction of the rotor in FIG. 2. It is preferable to extend further toward the center of the rotor as shown by two-dot lines, hereby, a portion of the rotor having both long and short blades in the view of the rotor profile is made. When the portion of the rotor has both long and short blades in the view of the rotor profile, a total number of blades increases in this portion of the rotor. Consequently, a property of the kneading operation is also increases. Also, the rotor profile at this portion of the rotor having both long and short blades is almost hexagonal. Accordingly, the rotor profile as shown in FIG. 1 is the rotor profile at the portion of the rotor having only 3 number of the long blades or only 3 number of the short blades.

An experimental example will be explained as follows with regard to a performance of the hermetically closed kneading apparatus which has be described in FIG. 1. A performance of a novel hermetically closed kneading apparatus according to the present invention is described comparing with one of prior hermetically closed kneading apparatus.

Figure 3:
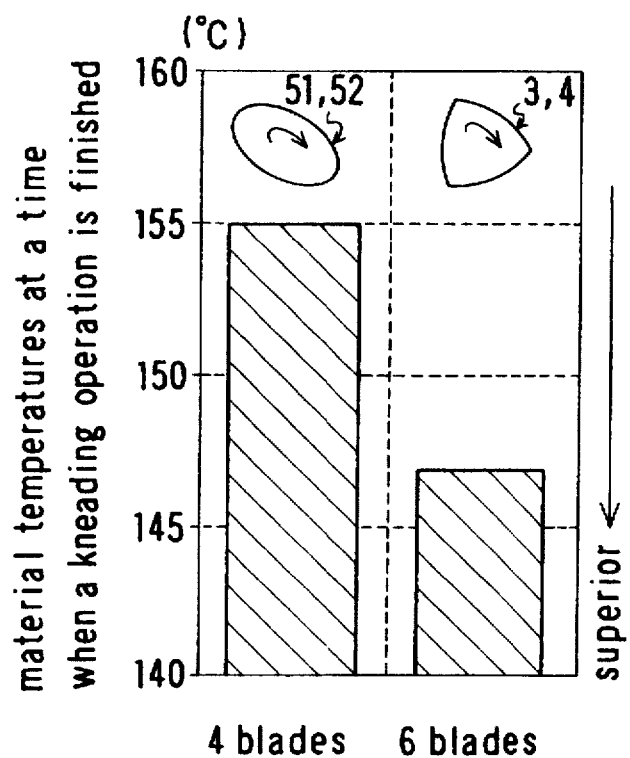
FIG. 3 shows a graph of material temperatures at a time when a kneading operation is finished according to the present invention.

The novel hermetically closed kneading apparatus comprises one pair of rotors 3, 4 each of which is provided with 6 total number of blades including 3 number of long blades and 3 number of short blades without meshing each other as shown in FIG. 3.

The prior hermetically closed kneading apparatus comprises one pair of rotors 51, 52 each of which is provided with 4 total number of blades including 2 number of long blades and 2 number of short blades without meshing each other as shown in FIG. 3. In a view of the rotor profile, both action and non-action surfaces of each rotors 51, 52 are contoured by convex lines and a whole shape of the rotor looks like an elliptic. A two-dimensional testing machine is used for this experiment. Each material temperature at a time when a kneading operation has finished is measured provided the same number of rotation times, the same amount of material and the same spent time for kneading all through the experiments.

Figure 4:
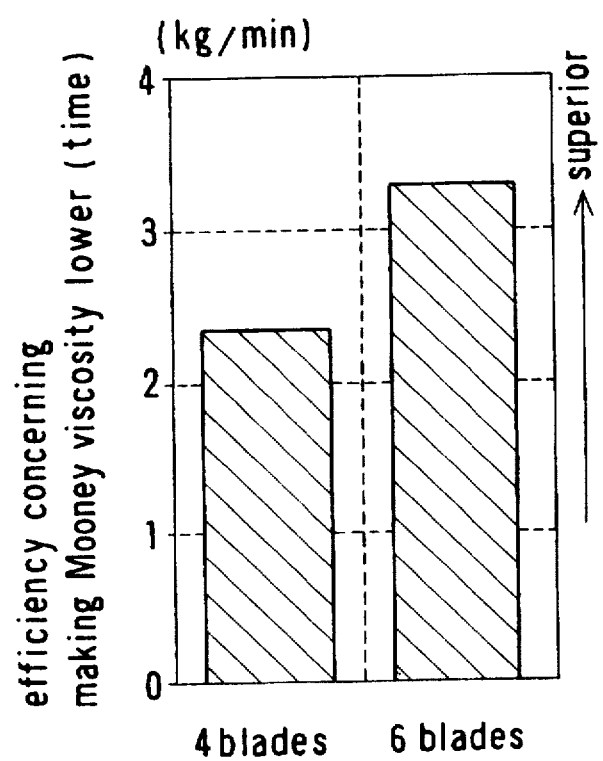
FIG. 4 shows a graph of an efficiency concerning making Mooney viscosity lower by a rotor in the present invention.

There are a large difference between the rotors 3, 4 provided with 6 total number of blades to each and the rotors 51, 52 provided with 4 total number of blades to each and it is understand easy from FIG. 3 that a cooling property of the former is more efficient than one of the latter. With respect to making Mooney viscosity lower, it is understand easy from FIG. 4 that the rotors 3, 4 provided with 6 total number of blades to each is more efficient than the rotors 51, 52 provided with 4 total number of blades to each. Accordingly, with respect to achieving a plasticization, the former is more efficient than the latter.

Further, the novel hermetically closed kneading apparatus comprising one pair of rotors provided with 6 total number of blades to each as shown in FIG. 2 according to the present invention is compared with the prior hermetically closed kneading apparatus comprising one pair of rotors provided with 4 total number of blades to each throughout a three-dimensional testing.

Figure 5:
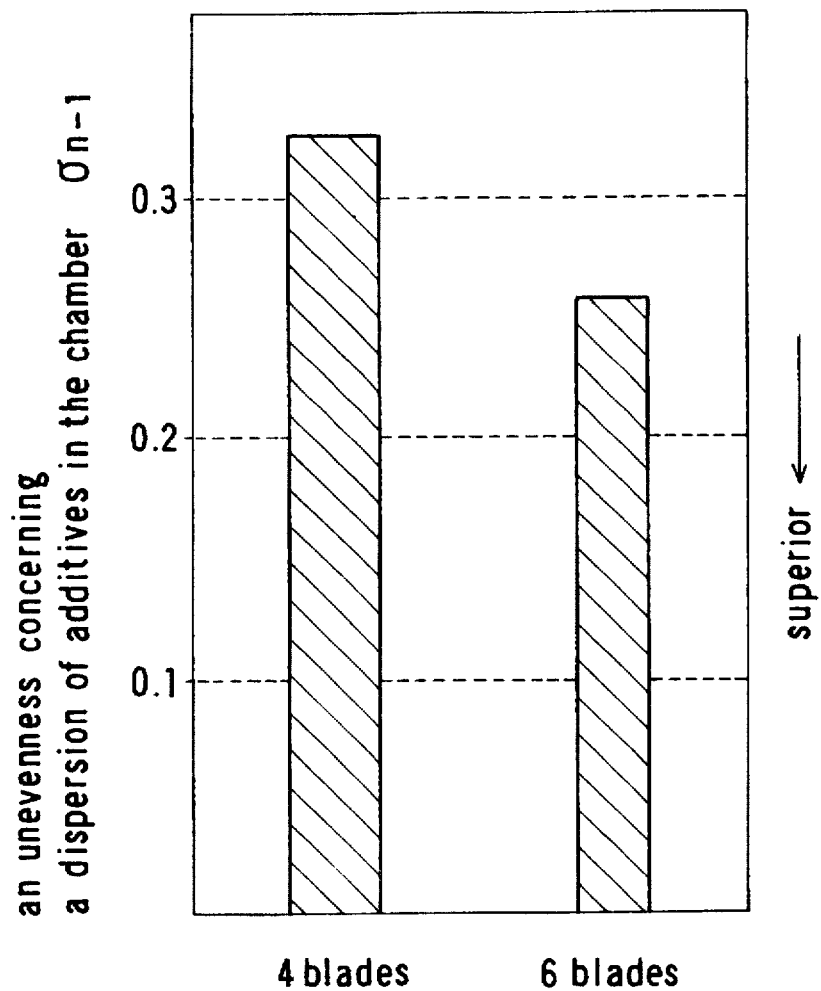
FIG. 5 shows a graph of an unevenness concerning a dispersion of additives in the chamber by a rotor in the present invention.

One experimental example is shown in FIG. 5, where one pair of rotors are compared with other pair of rotors concerning a property of a distribution. Each rotor in one pair has 6 total number of blades including 3 number of long blades and 3 number of short blades which are set apart from each other by an offset angle α=60° in a circumferential direction of the rotor and a length ratio of the short blade to the long blade is 0.1. Each rotor in other pair has 4 total number of blades including 2 number of long blades and 2 number of short blades which are set apart from each other by an offset angle α=90° in a circumferential direction of the rotor and a length ratio of the short blade to the long blade is 0.2.

With respect to an evenness of a dispersion of additives in the chamber according to FIG. 5, the rotors provided with 6 total number of blades to each are more efficient than the rotors provided with 4 total number of blades to each. Accordingly, with respect to achieving a uniform distribution, the former is more efficient than the latter.

Next, influences which are brought by a shape of a non-action surface are described comparing the rotors shown in FIG. 1 with rotors shown in FIG. 6 (the first comparative example) or FIG. 7 (the second comparative example). Here, the two-dimensional testing machine as mentioned above is used for this experiment.

In FIG. 6 (the first comparative example), a portion 67 between tips of each rotor 61,62 is divided almost equally into a non-action surface 63 and an action surface 64. A shape of the non-action surface 63 is concave and a shape of the action surface 64 is convex. In FIG. 7 (the second comparative example), a portion 76 between tips of each rotor 71,72 is divided almost equally into a non-action surface 73 and an action surface 74. Both shapes of the non-action and action surfaces are convex.

In FIG. 6 (the first comparative example), Comparatively large voids 65, 66 appears in a vicinity of the non-action surface and the bridge part 16. This means that an amount of a material taken-in from the vicinity of the bridge part 16 onto the non-action surface reduces. Further, there are some of carbon remaining without mixing with the material. This may be caused from voids 65 on the non-action surface.

In FIG. 7 (the second comparative example), Comparatively large void 75 appears in a vicinity of the bridge part 16. This means that an amount of a material taken-in from the vicinity of the bridge part 16 onto the non-action surface reduces.

On the contrary, in FIG. 1 showing the example of the present invention having a straight line in the sectional shape of the non-action surface, void 25 appears in a vicinity of the bridge part 16. This void 25 is comparatively small with ones in FIG. 6 (the first comparative example) and FIG. 7 (the second comparative example). This means that an amount of a material taken-in from the vicinity of the bridge part 16 onto the non-action surface less reduces than ones in FIG. 6 (the first comparative example) and FIG. 7 (the second comparative example). In other words, even though the one pair of rotors 3,4 do not mesh with each other, it is achieved by means of properly designing the shapes of the non-action surfaces of the rotors 3,4 to assure the same amount of the kneaded material taken-in on the non-action surface as taken-in by a pair of rotors meshing with each other.

Figure 8:
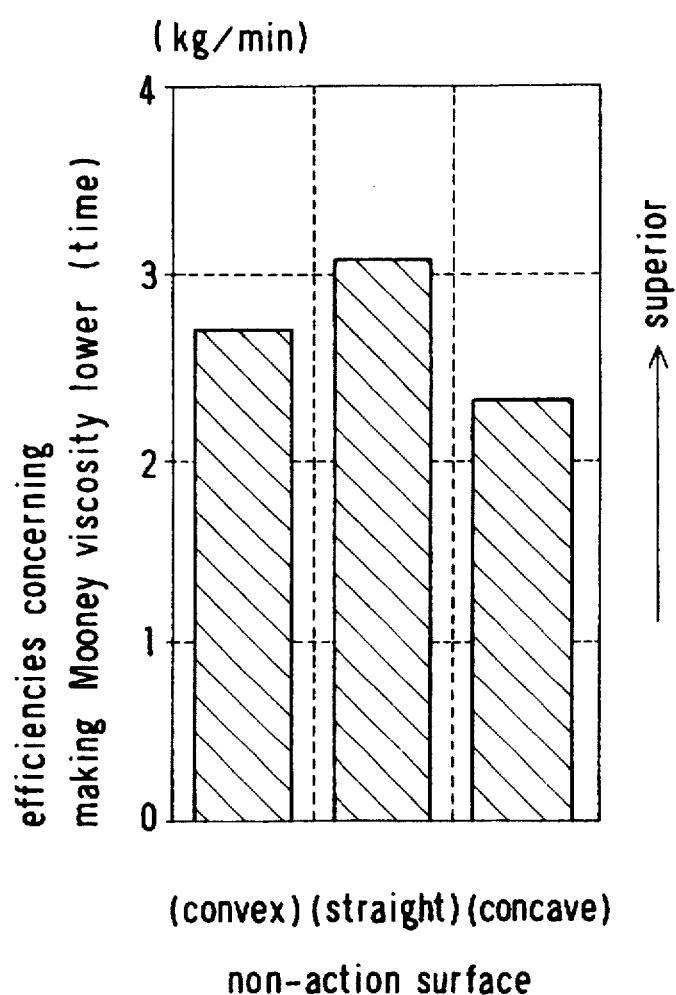
FIG. 8 shows a graph of efficiencies concerning making Mooney viscosity lower by rotors in the present invention, the first comparable example and the second comparable example.

This effect is clearly confirmed by differences on efficiencies concerning making Mooney viscosity lower as shown in FIG. 8. The differences of efficiencies are caused from differences on the shapes of the rotors.

In the view of the rotor profile, the efficiencies concerning making Mooney viscosity lower becomes better in order of straight line (the present invention), convex line (the second comparative example), concave line (the first comparative example). In other words, it is preferable that the sectional shape of the non-action surface is almost straight line. And it is more preferable that a sectional shape of the non-action surface is such a straight line as has a tendency to a convex line.

The sectional shape of the non-action surface as above enables the amount of the material taken-in on the non-action surface to increase, accordingly, opportunities of the material undergoing the kneading operation to increase.

It has been described referring to FIG. 1 that the sectional shape of the non-action surface is a straight line or the whole rotor profile is almost triangular. In fine, it is an important that the rotor profile includes any one of an approximately gentle concave line, an approximately gentle convex line and an approximate straight line in each non-action surface of the rear surfaces of the blades with respect to the rotation direction and the non-action surfaces are smoothly linked to the action surfaces respectively.

At standing this point, results of verifying the rotor shape according to various flat degrees of the non-action surface will be explained as follows.

Figure 9:
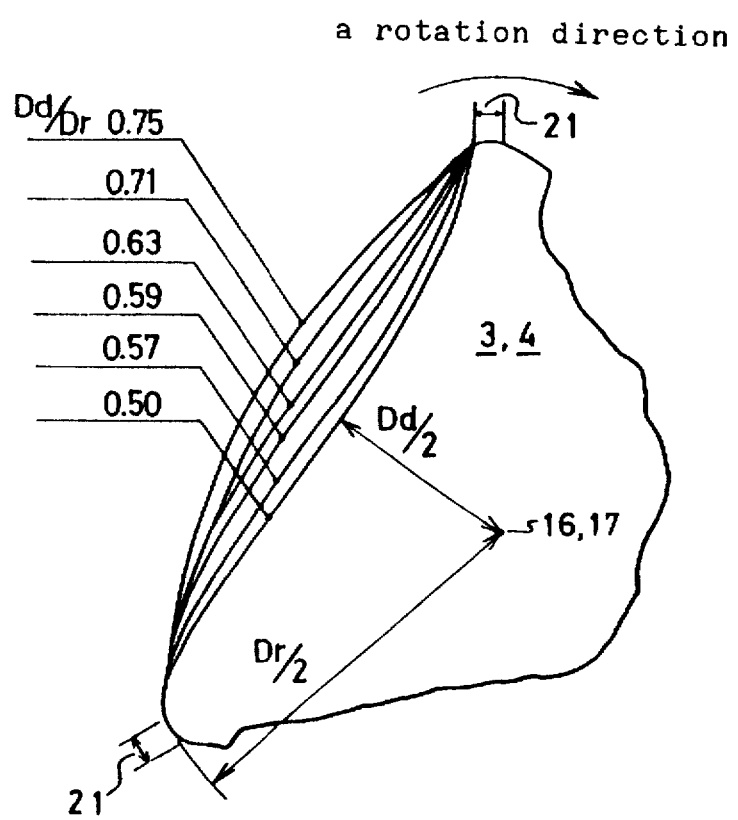
FIG. 9 shows an essentially sectional view of a rotor in another hermetically closed kneading apparatus according to the present invention.

In the view of the rotor profile, a ratio Dd/Dr of a minimum diameter Dd to a maximum diameter Dr of the rotor is used for defining the flat degrees of the non-action surface as shown in FIG. 9. A sectional shape of each rear surfaces of the blades with respect to the rotation direction is contoured by any one of an approximately gentle concave line, an approximately gentle convex line and an approximate straight line. Here, in the view of the rotor profile, a surface extending backward by a distance which falls in a range from ½ to 9/10 of the rear surface with respect to the rotation direction is defined as the non-action surface which has a high flat degrees. In the view of the rotor profile, a shape of a remaining surface subtracted the non-action surface from the rear surface is contoured by any either an approximately gentle convex line or an approximate straight line. In this case as above, an allowable range of the ratio Dd/Dr concerning the rotor diameter falls in a range 0.5<Dd/Dr<0.75. This range establishes a clear distinction between the present invention and such prior arts as shown in FIG. 6 and FIG. 7 in an efficiency of the kneading operation. Further, an suitable range of the ratio Dd/Dr concerning the rotor diameter is a range 0.6<Dd/Dr<0.7. It is preferable to make the sectional shape of the non-action surface straight as far as we can.

The results of two-dimensional tests have been mentioned above mainly. Next, results concerning influences on an axial direction of the rotor will be described throughout three-dimensional tests. Result of the three-dimensional tests concerning the kneading operation using a sham material and the rotor provided with long and short blades which are not joined to each other as shown in FIG. 2 will be described comparing with a rotor provided with long and short blades which are joined to each other so as to identify such stop points 30b, 31b, 32b of the short blades as in FIG. 2 with such stop points 18b, 19b, 20b of the long blades as in FIG. 2.

The three-dimensional tests are executed under two kind of conditions. The first condition is that the long and short blades are not joined to each other. The second condition is that the long and short blades are joined to each other.

Figure 10:
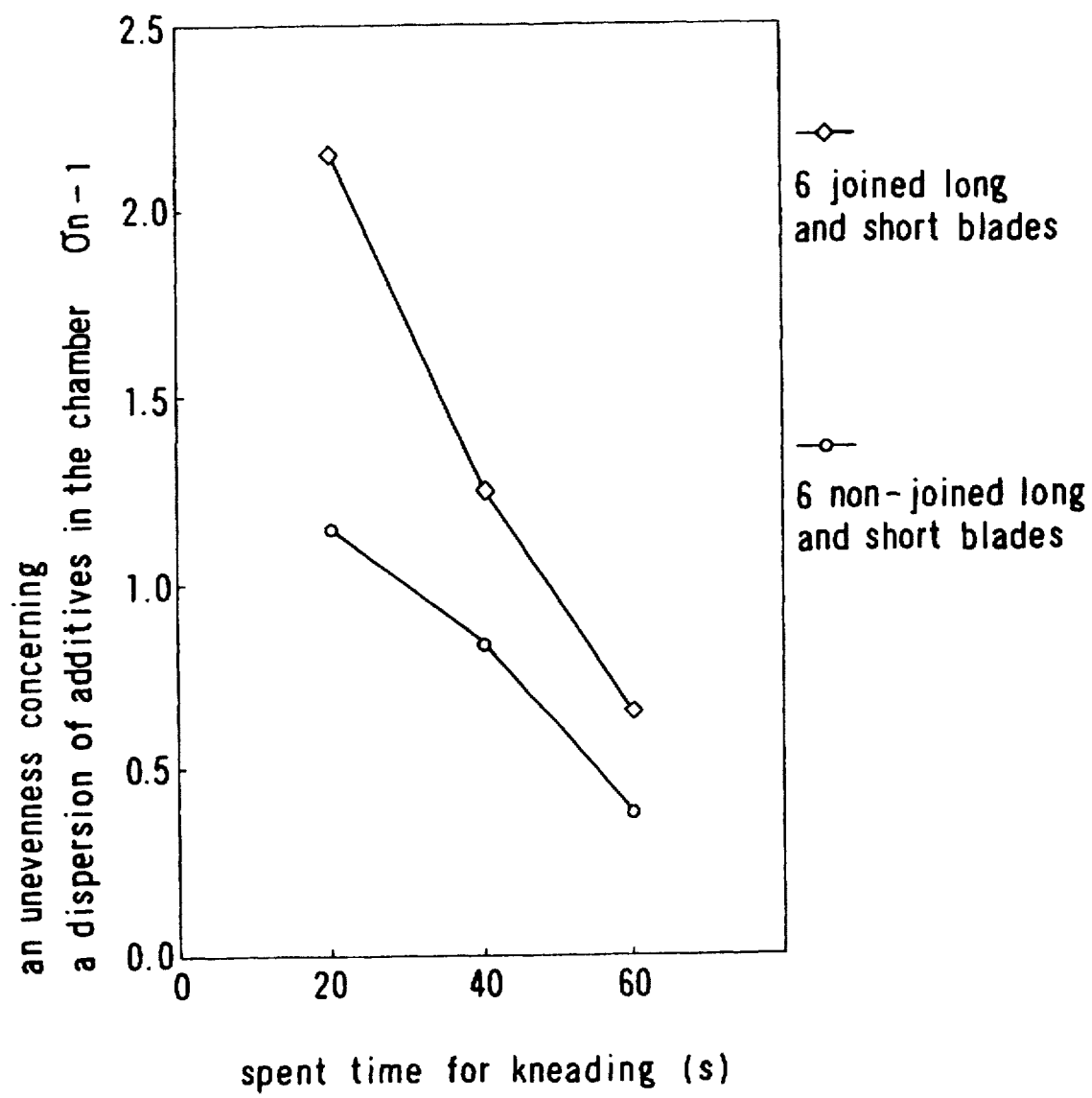
FIG. 10 shows a graph of an unevenness concerning a dispersion of additives in the chamber by a rotor in the present invention.

Result of rotor provided with 6 total number of long and short blades is shown in FIG. 10. And, result of rotor provided with 4 total number of long and short blades is shown in FIG. 11.

Figure 11:
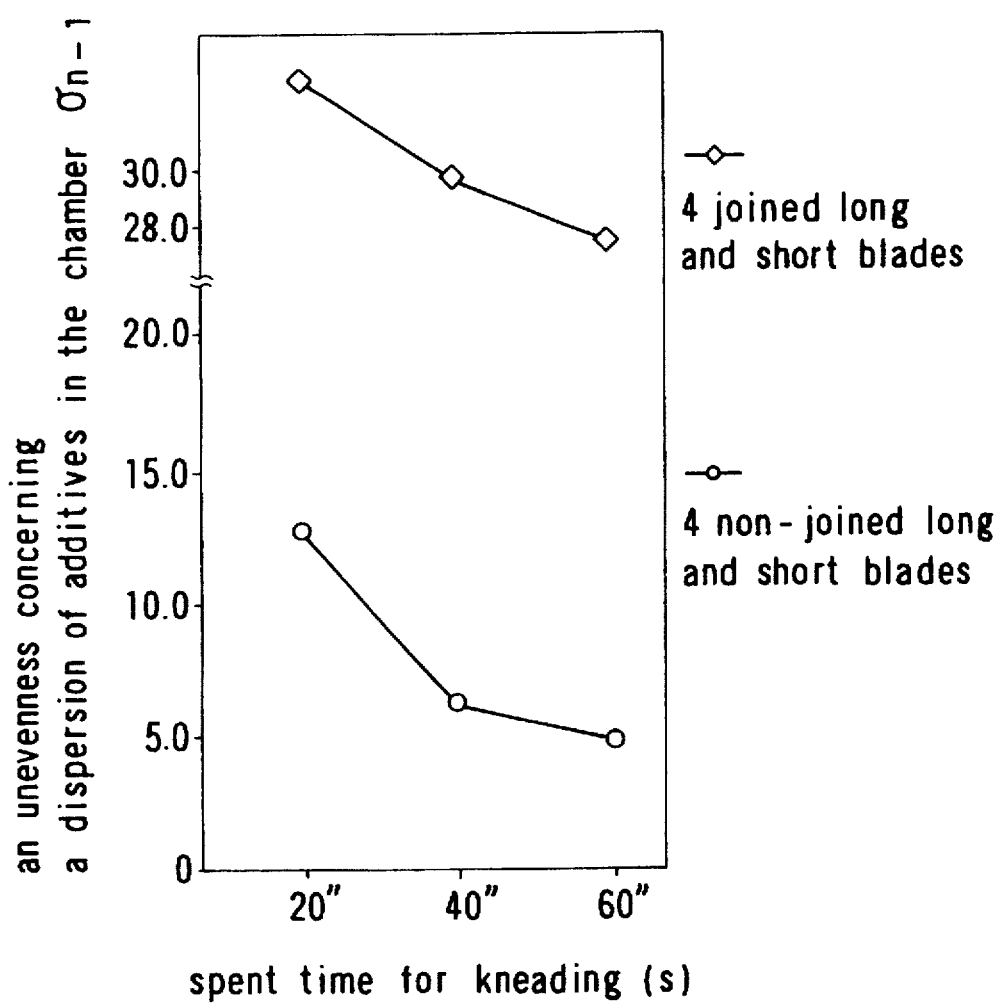
FIG. 11 shows a graph of an unevenness concerning a dispersion of additives in the chamber by a rotor having 4 number of blades.

As shown in both FIG. 10 and FIG. 11, with respect to the unevenness concerning the dispersion of additives in the chamber, the first condition of non-joined long and short blades is less than the second condition of joined long and short blades. The rotor provided with the non-joined long and short blades has more efficiency of the kneading operation than the rotor provided with the joined long and short blades.

Figure 12:
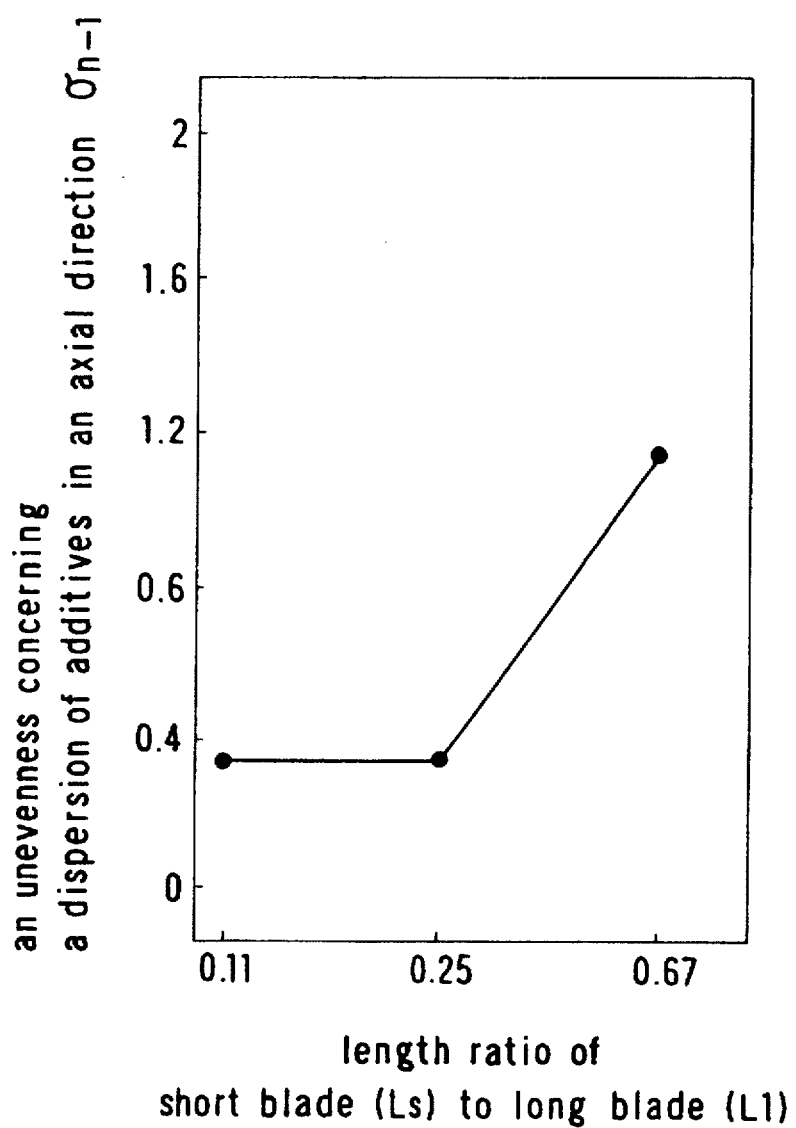
FIG. 12 shows a graph of an unevenness concerning a dispersion of additives in the chamber by a rotor having 6 number of long and short blades which are not joined each other in the present invention of kneading apparatus.

Next, results of influences caused from the length ratio of short blade to long blade provided that the long blade and the short blade is not joined to each other will be described referring to FIG. 12. Kneading tests are executed according to a various length ratio of the short blade to the long blade using a sham material and such rotor as provided with 6 total number of blades shown in FIG. 2. The various length ratio is made by means of changing a length ratio of such rotor as shown FIG. 2. The lower the length ratio is, the more the property of distribution is improved. However, the length ratio of 0.67 still shows the useful property of distribution. when the ratio is lower than 0.1, it is difficult on form to manufacture the rotor. Accordingly, the suitable range of the ratio concerning the blade length is a range form 0.1 to 0.67.

From the description of the above embodiments, it is clear that the embodiment provided with 6 total number of long and short blades which are not joined to each other is superior in the kneading operation to any other embodiments or any comparative example. However, the embodiment provided with 6 total number of long and short blades which are joined to each other is superior to the comparative example provided with 4 total number of long and short blades which are not joined to each other. Therefore, the embodiment provided with 6 total number of long and short blades which are joined to each other,is still included in the present invention and this fact will be described referring to FIG. 13 and FIG. 14.

Figure 13:
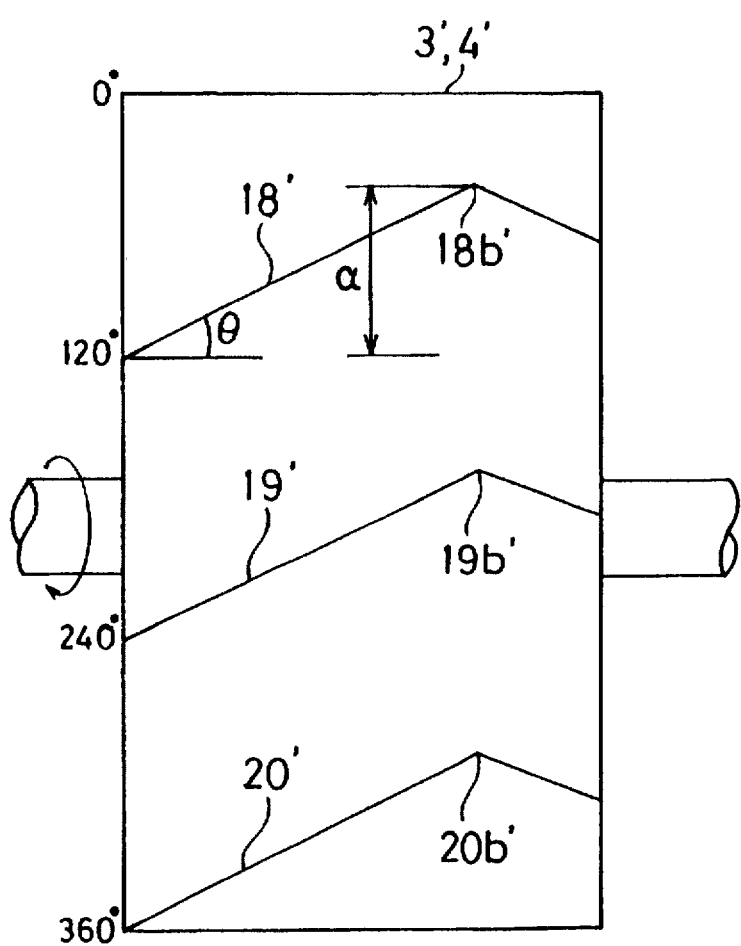
FIG. 13 shows a development of a rotor having 6 number of long and short blades which are joined to each other in the present invention of kneading apparatus and FIG. 14 shows a graph of unevenness concerning a dispersion of additives in the chamber according to the present invention and the comparative example, wherein a rotor in the present invention of kneading apparatus has 6 number of long and short blades which are joined to each, other and wherein a rotor in the comparative example has 4 number of long and short blades which are not joined to each other.

A development of each rotor 3', 4' having 6 number of long and short blades which are joined to each other will described referring to FIG. 13.

Each of long blades 18', 19', 20', which is set apart from each other by an 120° equivalent angle in a circumferential direction of the rotor, extends in an axial direction from one end toward a center of the rotor with a gradient(θ) from the axial direction so as to extend spirally around a central axis of the rotor and then stops extending at a stop point in a part of the way in order to move a kneaded material toward the center of the rotor. Further, each of short blades extends in the axial direction spirally around the central axis of the rotor from the stop point 18b', 19b', 20b towards to other end with a gradient (−θ) from the axial direction. The length ratio of the short blade to the long blade is the same ratio as shown in FIG. 2.

A rotor provided with 4 total number of long and short blades which are not joined to each other is used as a comparative example with the rotor provided with 6 total number of long and short blades which are joined to each other.

This 4 blades rotor is made by means of omitting one pair of long and short blades from such the rotor as shown FIG. 2 and arranging rest blades apart from each other by an 180° equivalent angle in the circumferential direction of the rotor.

Figure 14:
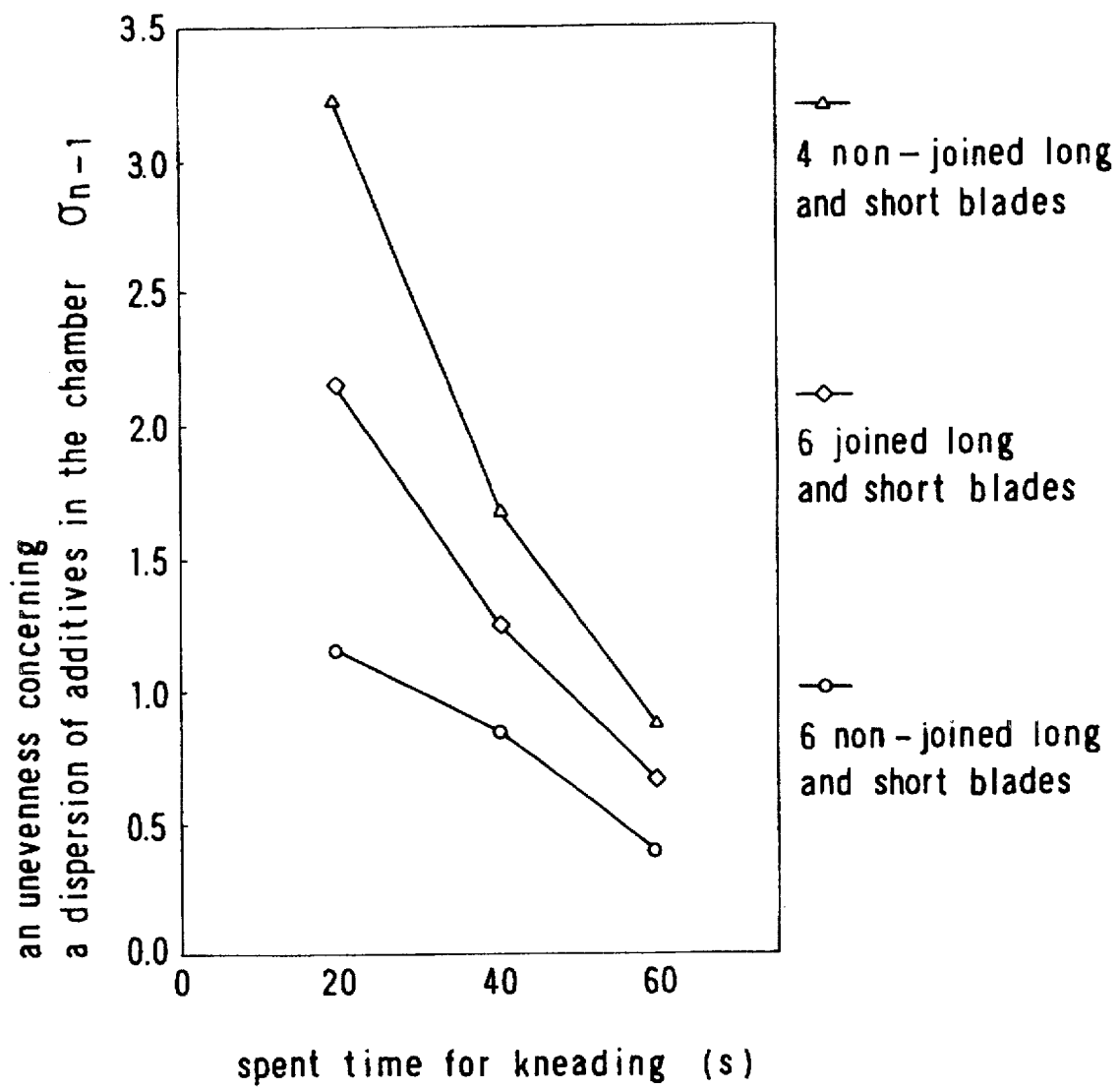

An unevenness concerning a dispersion of additives in the chamber will be described in FIG. 14 comparing the present invention provided 6 total number of joined long and short blades with the comparative example provided 4 total number of non-joined long and short blades.

It is clear from FIG. 14 that the rotor provided with 6 total number of joined long and short blades is superior to the comparative example provided with 4 total number of non-joined long and short blades with respect to the unevenness concerning a dispersion of additives in the chamber as well as the rotor provided with 6 total number of non-joined long and short blades.

In fine, important things in the present invention are only that one pair of rotors without meshing with each other, each of the rotors is provided with 6 total number of long and short blades and the rotor profile has a relative rotor profile to FIG. 1.

In other words, difference between the rotor provided with 6 total number of non-joined long and short blades and the rotor provided with 6 total number of joined long and short blades corresponds to a difference between a best embodiment and a better embodiment.

INDUSTRIAL APPLICABILITY

A hermetically closed kneading apparatus comprising one pair of rotors wherein each rotor has 3 number of long blades apart from each other by an equivalent angle in a circumferential direction of the rotor and wherein a sectional shape of a non-action surface in a rear surface of the rotor with respect to a rotation direction is comparatively flat.

Whereby, a cooling property is increased, a number of kneading performance times is decreased, a capacity of a material in a chamber is prevented from decreasing and a carbon is prevented form remaining without mixing with the material.

Accordingly, this present invention is especially suitable for a hermetically closed kneading apparatus for kneading a rubber used for tire since such a kneading apparatus requires a powerful kneading operation.

We claim:

1. A hermetically closed kneading apparatus, comprising:
   a casing member having a hermetical chamber;
   a first and a second rotor in said chamber in parallel with each other, said rotors rotating in mutually opposite directions, each of said rotors having three long blades wherein central axes of said rotors are set apart from each other so that said long blades do not mesh with each other, wherein
   each of said long blades on a respective one of said rotors extends spirally around the central axis of the respective rotor, each of said long blades is set apart from the others of said long blades by an equivalent angle in a circumferential direction of said rotor;
   said rotors having a substantially triangular profile respectively; each side of said triangular profiles including an action surface and a non-action surface, wherein a sectional contour line of said non-action surface comprises a substantially straight line starting from an edge of a tip of said blade.

2. A hermetically closed kneading apparatus according to claim 1, wherein said action surface further comprises a convex surface, wherein said action surface and said non-action surface are smoothly linked together.

3. A hermetically closed kneading apparatus according to claim 1, wherein each said rotor further comprises three short blades which have similar sectional shapes to those of said long blades, and said short blades are not joined to said long blades.

4. A hermetically closed kneading apparatus according to claim 3, wherein a length ratio of said short blades to said long blades falls in a range from 0.1 to 0.67.

5. A hermetically closed kneading apparatus according to claim 3, wherein said long and short blades intersect a plane on each said rotor, said plane being substantially perpendicular to said central axis of said rotor.

6. A hermetically closed kneading apparatus according to claim 1, wherein said rotors further have a maximum diameter Dr and a minimum diameter Dd respectively of which ratio falls in a range 0.5<Dd/Dr<0.75.

7. A hermetically closed kneading apparatus according to claim 1, wherein said rotors further have a maximum diameter Dr and minimum diameter Dd respectively of which ratio falls in a range 0.6<Dd/Dr<0.7.

8. A hermetically closed kneading apparatus, comprising:
   a casing member having a hermetical chamber;
   a first and a second rotor in said chamber in parallel with each other, said rotors rotating in mutually opposite directions, each of said rotors having three long blades wherein central axes of said rotors are set apart from each other so that said long blades do not mesh with each other, wherein
   each of said long blades on a respective one of said rotors extends spirally around the central axis of the respective rotor, each of said long blades is set apart from the others by an equivalent angle in a circumferential direction of said rotor;
   said rotors having a substantially triangular profile respectively; said triangular profile having a maximum diameter Dr and minimum diameter Dd respectively of which ratio falls in a range 0.5<Dd/Dr<0.75.

9. A hermetically closed kneading apparatus according to claim 8, wherein each side of said triangular profile includes an action surface and a non-action surface, said action surface comprises a convex surface, wherein said action surface and said non-action surface are smoothly linked together.

10. A hermetically closed kneading apparatus according to claim 8, wherein each side of said triangular profile includes an action surface and a non-action surface, wherein a sectional contour line of said non-action surface consists of an approximate straight line having a slightly convex portion.

11. A hermetically closed kneading apparatus according to claim 8, wherein each said rotor further comprises three short blades which have similar sectional shapes to those of said long blades, and said short blades are not joined to said long blades.

12. A hermetically closed kneading apparatus according to claim 11, wherein a length ratio of said short blades to said long blades falls in a range from 0.1 to 0.67.

13. A hermetically closed kneading apparatus according to claim 11, wherein said long and short blades on each respective said rotor intersect a plane on each said rotor, said plane being substantially perpendicular to said central axis of said rotor.

14. A hermetically closed kneading apparatus, comprising:
   a casing member having a hermetical chamber;
   a first and a second rotor in said chamber in parallel with each other, said rotors rotating in mutually opposite directions, each of said rotors having three long blades wherein central axes of said rotors are set apart from each other so that said long blades do not mesh with each other, wherein
   each of said long blades on a respective one of said rotors extends spirally around the central axis of the respective rotor, each of said long blades is set apart from the others by an equivalent angle in a circumferential direction of said rotor;
   said rotors having a substantially triangular profile respectively; said triangular profile having a maximum diameter Dr and a minimum diameter Dd respectively of which ratio falls in a range 0.6<Dd/Dr<0.7.

15. A hermetically closed kneading apparatus according to claim 14, wherein each side of said triangular profile includes an action surface and a non-action surface, said action surface comprises a convex surface, wherein said action surface and said non-action surface are smoothly linked together.

16. A hermetically closed kneading apparatus according to claim 14, wherein each side of said triangular profile including an action surface and a non-action surface, wherein a sectional contour line of said non-action surface consists of an approximate straight line having a slightly convex portion.

17. A hermetically closed kneading apparatus according to claim 14, wherein each said rotor further comprises three short blades which have similar sectional shapes to those of said long blades, and said short blades are not joined to said long blades.

18. A hermetically closed kneading apparatus according to claim 17, wherein a length ratio of said short blades to said long blades falls in a range from 0.1 to 0.67.

19. A hermetically closed kneading apparatus according to claim 17, wherein said long and short blades on each said rotor intersect a plane on each said rotor, said plane being substantially perpendicular to said central axis of said rotor.

* * * * *